United States Patent
Song et al.

(10) Patent No.: US 9,374,264 B2
(45) Date of Patent: Jun. 21, 2016

(54) SYSTEM AND METHOD FOR TRANSMITTING AND RECEIVING SESSION INITIATION PROTOCOL MESSAGES

(75) Inventors: Jae Min Song, Seoul (KR); Byung Jae Park, Yangju-si (KR); Hee Tae Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 226 days.

(21) Appl. No.: 14/003,161

(22) PCT Filed: Mar. 2, 2012

(86) PCT No.: PCT/KR2012/001572
§ 371 (c)(1),
(2), (4) Date: Sep. 4, 2013

(87) PCT Pub. No.: WO2012/121514
PCT Pub. Date: Sep. 13, 2012

(65) Prior Publication Data
US 2013/0343375 A1    Dec. 26, 2013

(30) Foreign Application Priority Data

Mar. 4, 2011    (KR) .......................... 10-2011-0019229

(51) Int. Cl.
| | |
|---|---|
| H04L 12/66 | (2006.01) |
| H04L 29/06 | (2006.01) |
| H04L 12/46 | (2006.01) |
| H04L 12/64 | (2006.01) |

(52) U.S. Cl.
CPC ...... *H04L 29/06197* (2013.01); *H04L 12/4633* (2013.01); *H04L 12/6418* (2013.01); *H04L 65/105* (2013.01); *H04L 65/1006* (2013.01); *H04L 65/1069* (2013.01); *H04L 65/608* (2013.01)

(58) Field of Classification Search
CPC .................................................. H04L 29/06027
USPC ........................................................... 370/352
See application file for complete search history.

(56) References Cited

U.S. PATENT DOCUMENTS

| | | | |
|---|---|---|---|
| 2003/0035409 A1* | 2/2003 | Wang et al. .................... | 370/349 |
| 2006/0078096 A1* | 4/2006 | Poyhonen et al. .......... | 379/88.12 |
| 2006/0168321 A1 | 7/2006 | Eisenberg et al. | |
| 2007/0136413 A1* | 6/2007 | Ishikawa et al. .............. | 709/200 |
| 2010/0195602 A1* | 8/2010 | Kovvali et al. ................ | 370/329 |

FOREIGN PATENT DOCUMENTS

KR    1020080020121 A    3/2008

OTHER PUBLICATIONS

International Search Report (PCT/ISA/210) dated Sep. 25, 2012 from the International Searching Authority in counterpart application No. PCT/KR2012/001572.

* cited by examiner

*Primary Examiner* — Samina Choudhry
(74) *Attorney, Agent, or Firm* — Sughrue Mion, PLLC

(57) ABSTRACT

Provided are a system and method for transmitting and receiving Session Initiation Protocol (SIP) messages. The system includes user equipment (UE) including an SIP client configured to generate an SIP message, and an external transport configured to receive the SIP message from the SIP client, generate a packet by combining a tunneling header with the received SIP message, and transmit the generated packet to an SIP broker server, and the SIP broker server configured to receive the packet from the external transport in the UE, remove the tunneling header from the packet, and transmit the SIP message from which the tunneling header has been removed to a communication counterpart.

23 Claims, 6 Drawing Sheets

SYSTEM AND METHOD FOR TRANSMITTING AND RECEIVING SESSION INITIATION PROTOCOL MESSAGES

CROSS-REFERENCE TO RELATED APPLICATION

This application is a National Stage of International Application No. PCT/KR2012/001572, filed on Mar. 2, 2012, and claims priority to and the benefit of Republic of Korea Patent Application No. 10-2011-0019229, filed on Mar. 4, 2011, the disclosure of which is incorporated herein by reference in its entirety.

BACKGROUND

1. Field

The present disclosure relates to technology for smoothly transmitting and receiving Session Initiation Protocol (SIP) messages in a network, and more particularly, to a system and method for transmitting and receiving SIP messages.

2. Discussion of Related Art

Voice over Internet protocol (VoIP) technology, also referred to as Internet telephony, has the purpose of providing a voice call service through the Internet. VoIP has merits in that it is possible to provide a voice call service at low charge and to easily provide various multimedia services using the voice call service. Thus, VoIP has been rapidly spreading in recent times.

As one base protocol for such an Internet telephony service, etc., there is SIP. SIP is a protocol that has been suggested by the Internet engineering task force (IETF) to establish and terminate a multimedia session. Due to its simplicity, SIP can be easily developed and implemented. Also, since SIP was designed for the Internet, it is possible to easily provide various multimedia services of the Internet.

In a VoIP service in which the aforementioned SIP is employed, a terminal generally exchanges messages with a proxy server using User Datagram Protocol (UDP). However, when the terminal is behind a firewall, etc., UDP packets cannot traverse the firewall, and it is impossible to provide the service.

SUMMARY

The embodiments of the present disclosure are directed to providing a system and method in which user equipment (UE) can smoothly exchange Session Initiation Protocol (SIP) messages with the outside even when the UE is inside a security means such as a firewall or so on.

According to an aspect of the present disclosure, there is provided a system for transmitting and receiving SIP messages including: UE including an SIP client configured to generate an SIP message, and an external transport configured to receive the SIP message from the SIP client, generate a packet by combining a tunneling header with the received SIP message, and transmit the generated packet to an SIP broker server; and the SIP broker server configured to remove the tunneling header from the packet received from the external transport, and transmit the SIP message from which the tunneling header has been removed to a communication counterpart of the UE.

According to another aspect of the present disclosure, there is provided an SIP broker server including: a first connection module connected with UE using Transmission Control Protocol (TCP) and configured to receive an SIP message combined with a tunneling header from the UE; a port management module configured to manage a port assigned to the UE connected with the first connection module; a message processing module configured to remove the tunneling header from the SIP message received from the first connection module; and a second connection module configured to transmit the SIP message from which the tunneling header has been removed to a communication counterpart of the UE using User Datagram Protocol (UDP).

According to still another aspect of the present disclosure, there is provided a method of transmitting and receiving SIP messages including: receiving, at an SIP broker server, a packet from UE; removing, at the SIP broker server, a tunneling header from the received packet to extract an SIP message; replacing, at the SIP broker server, a source address of the extracted SIP message with an address of the SIP broker server; and transmitting, at the SIP broker server, the extracted SIP message to a communication counterpart of the UE.

According to yet another aspect of the present disclosure, there is provided a method of transmitting and receiving SIP messages including: receiving, at an SIP broker server, an SIP message from a communication counterpart; replacing, at the SIP broker server, a destination address of the received SIP message with a local address of UE; generating, at the SIP broker server, a packet by combining a tunneling header with the SIP message whose destination address has been replaced; and transmitting, at the SIP broker server, the generated packet to the UE.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, detailed embodiments of the present disclosure will be described with reference to the accompanying drawings. However, the described embodiments are merely examples and not to be construed as limiting the scope of the present disclosure.

When it is determined that the detailed description of known art related to the present disclosure may obscure the gist of the present disclosure, the detailed description thereof will be omitted. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided only to efficiently describe the spirit of the present disclosure to those of ordinary skill in the art.

Figure 1:
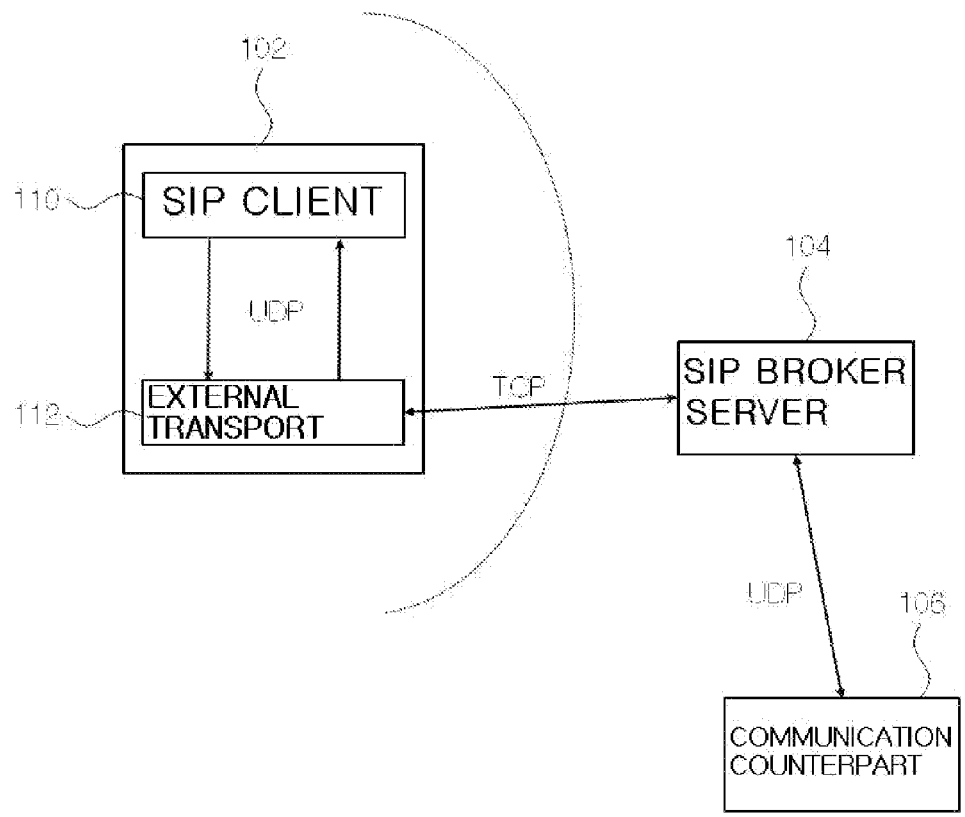
FIG. 1 is a diagram illustrating the overall constitution of a system for transmitting and receiving Session Initiation Protocol (SIP) messages according to an exemplary embodiment of the present disclosure.

FIG. 1 is a diagram illustrating the overall constitution of a system for transmitting and receiving Session Initiation Protocol (SIP) messages according to an exemplary embodiment of the present disclosure.

In exemplary embodiments of the present disclosure, SIP is a protocol serving as a gate for transmitting various types of data over the Internet. SIP is a protocol at the application layer that specifies a procedure for parties wishing to communicate over the Internet via telephone, Internet conference, instant messenger, etc., to identify each other, locate each other, and establish, remove, or modify a multimedia communication session between them, and is widely used in the fields of video conferencing, distribution of streaming moving pictures, messenger service, subscriber state information, file transmission, online games, and so on. In particular, SIP is a text-based protocol that has been developed using many parts of HyperText Transfer Protocol (HTTP) and Simple Mail Transfer Protocol (SMTP) without modification, and thus is readily implemented. Also, SIP is flexible and expansible, and thus can be combined with many other protocols used on the Internet to implement various services.

As shown in the drawing, a system 100 for transmitting and receiving SIP messages according to an exemplary embodiment of the present disclosure Includes user equipment (UE) 102 and an SIP broker server 104.

The UE is a terminal for generating and transmitting an SIP message to a communication counterpart 106, or processing an SIP message received from the communication counterpart 106. In general, an SIP service provider has an SIP proxy server for service provision, and in this case, the communication counterpart 106 may be the SIP proxy server of the SIP service provider. The SIP proxy server is a server for the SIP service provider to provide SIP service to the UE 102. The SIP proxy server is connected with the SIP broker server 104 and receives the generated SIP message from the UE 102 via the SIP broker server 104. Also, when there is an SIP message to be transmitted to the UE 102, the SIP proxy server transmits the SIP message via the SIP broker server 104. Meanwhile, when the UE 102 is a terminal for peer-to-peer (P2P) communication with another terminal, the communication counterpart 106 may be a terminal of another user.

The UE 102 may be, for example, an Internet telephone employing SIP. Needless to say, the present disclosure is not limited to such an Internet telephony service and can be applied to any type of terminal that performs communication using the SIP.

In an exemplary embodiment of the present disclosure, the UE is inside a security means 108, for example, a firewall, etc., and communicates with other elements of a network present outside the security means 108 using SIP. However, the security means 108 such as a firewall, etc. generally blocks User Datagram Protocol (UDP) packets and only passes TCP packets for the purpose of security, and so on. Thus, SIP messages that use UDP packets cannot traverse the security means 108. For this reason, in an exemplary embodiment of the present disclosure, the UE 102 is configured to convert a generated SIP message into a data packet based on TCP by combining a tunneling header with the SIP message, and then cause the data packet to traverse the security means 108. Detailed SIP message tunneling including a detailed constitution of such a tunneling header in an exemplary embodiment of the present disclosure will be described later.

After receiving the packet from the UE 102, the SIP broker server 104 extracts only the SIP message from the packet by removing the tunneling header from the packet, and transmits the extracted SIP message to the communication counterpart 106. At this time, the SIP broker server 104 replaces a source address of the extracted SIP message with an address of the SIP broker server 104 and transmits the SIP message to the communication counterpart 106 (In exemplary embodiments of the present disclosure, an "address" denotes a network address of the corresponding element, that is, an Internet protocol (IP) address and a port number, unless mentioned otherwise). When the source address of the SIP message is replaced with the address of the SIP broker server 104 in this way, the communication counterpart 106 recognizes that the message has been transmitted from the SIP broker server 104 rather than the UE 102, and also delivers a response message to the SIP message to the SIP broker server 104.

When an SIP message whose destination is the UE 102 (e.g., a response message to the SIP message transmitted from the UE 102) is received from the communication counterpart 106, the SIP broker server 104 replaces a destination address of the received SIP message with a local address of the UE 102, generates a packet by combining a tunneling header with the changed SIP message, and transmits the generated packet to the UE 102. In other words, since the SIP message that the SIP broker server 104 receives from the communication counterpart 106 has the address of the SIP broker server 104 as the destination address, the SIP broker server 104 replaces the destination address with the local address of the UE 102, such that the UE 102 can recognize the SIP message as a normal message transmitted from the communication counterpart 106 to the UE 102.

Meanwhile, in an exemplary embodiment of the present disclosure, the UE 102 includes an SIP client 110 and an external transport 112.

The SIP client 110 is a module that generates an SIP message to be transmitted to the outside, or processes an SIP message received from the outside. A type of the SIP client 110 varies according to the type of an exchanged SIP message. For example, when the exchanged SIP message is a message for an Internet telephone, the SIP client 110 may be an Internet telephone module configured in the UE 102.

The external transport 112 receives the SIP message generated by the SIP client 110, generates a packet by combining a tunneling header with the received SIP message, and transmits the generated packet to the SIP broker server 104 present outside the security means 108 using TCP. Also, when a packet is received from the SIP broker server 104, the external transport 112 extracts only an SIP message by removing a tunneling header from the received packet, and transmits the extracted SIP message to the SIP client 110.

As described above, the SIP client 110 is a module for transmitting and receiving SIP messages, and transmits or receives an SIP message to or from the outside using UDP. However, such a UDP packet cannot traverse the security means 108 such as a firewall, etc., and the external transport 112 combines the tunneling header with the SIP message received from the SIP client 110 to convert the SIP message into a TCP packet so that the message can traverse the security means 108. Also, even when an SIP message is received by the UE 102, the SIP broker server 104 between the communication counterpart 106 and the UE 102 combines a tunneling header with the SIP message received from the communication counterpart 106 to convert the SIP message into a TCP packet so that the message can traverse the security means 108. In other words, an SIP message exchanged in the present disclosure is combined with a tunneling header and thereby converted into a TCP packet immediately before traversing the security means 108. Accordingly, the SIP message can arrive at a destination without being blocked by the security means 108.

Figure 2:
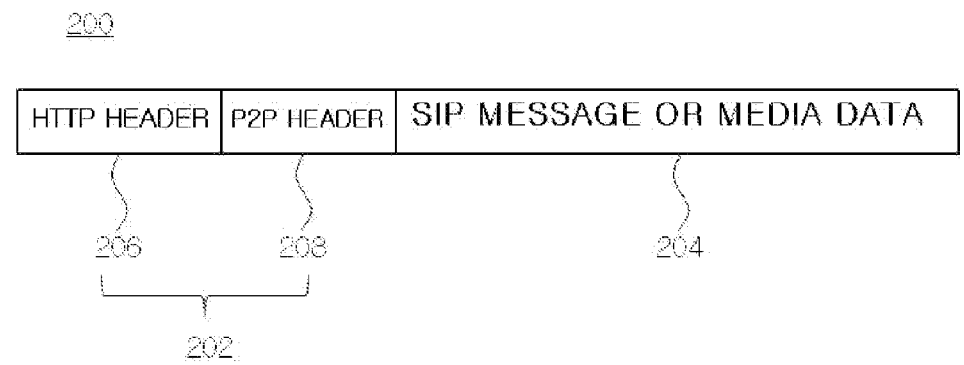
FIG. 2 is a diagram illustrating a packet combined with a tunneling header according to an exemplary embodiment of the present disclosure.

FIG. 2 is a diagram illustrating a packet combined with a tunneling header according to an exemplary embodiment of the present disclosure.

As shown in the drawing, a packet 200 according to an exemplary embodiment of the present disclosure includes a tunneling header 202 and a body 204.

The tunneling header 202 is intended to wrap an SIP message such that the SIP message can traverse the security means 108, and includes an HTTP header 206 and a P2P header 208.

The HTTP header 206 is intended to wrap the SIP message as an HTTP packet, and is configured according to the HTTP standard agreement. In other words, since the HTTP header 206 is combined with the SIP message generated by the SIP client 110, the security means 108 determines the message as a general HTTP packet that uses the TCP 80 port and passes the packet.

The P2P header 208 is placed at the rear end of the HTTP header 206 and includes an IP address and port information of a destination. For example, in the case of an SIP message transmitted from the SIP client 110 to the communication counterpart 106, the IP address and port information of the communication counterpart 106 are stored in the P2P header 208. Also, in the case of an SIP message transmitted from the communication counterpart 106 to the SIP client 110, the local address of the UE 102 is stored in the P2P header 208.

In the body 204, a text-based SIP message or binary media data to be delivered from the SIP client 110 to the communication counterpart 106 is stored. Also, according to need, the body 204 may include a message for session establishment for SIP message tunneling between the external transport 112 and the SIP broker server 104. Such a session establishment message may include, for example, the following.

TABLE 1

| Message | Source | Destination | Description |
| --- | --- | --- | --- |
| REQUEST_PORT | UE | SIP broker server | Request for new port assignment |
| REQUEST_PORT:(port number) | UE | SIP broker server | Request for port reassignment |
| REQUEST_PORT:SUCCESS | SIP broker server | UE | Response to port assignment request |

TABLE 1-continued

| Message | Source | Destination | Description |
| --- | --- | --- | --- |
| RELEASE_PORT:(port number) | UE | SIP broker server | Request for port release |
| RELEASE_PORT:SUCCESS | SIP broker server | UE | Response to port release request |

Figure 3:
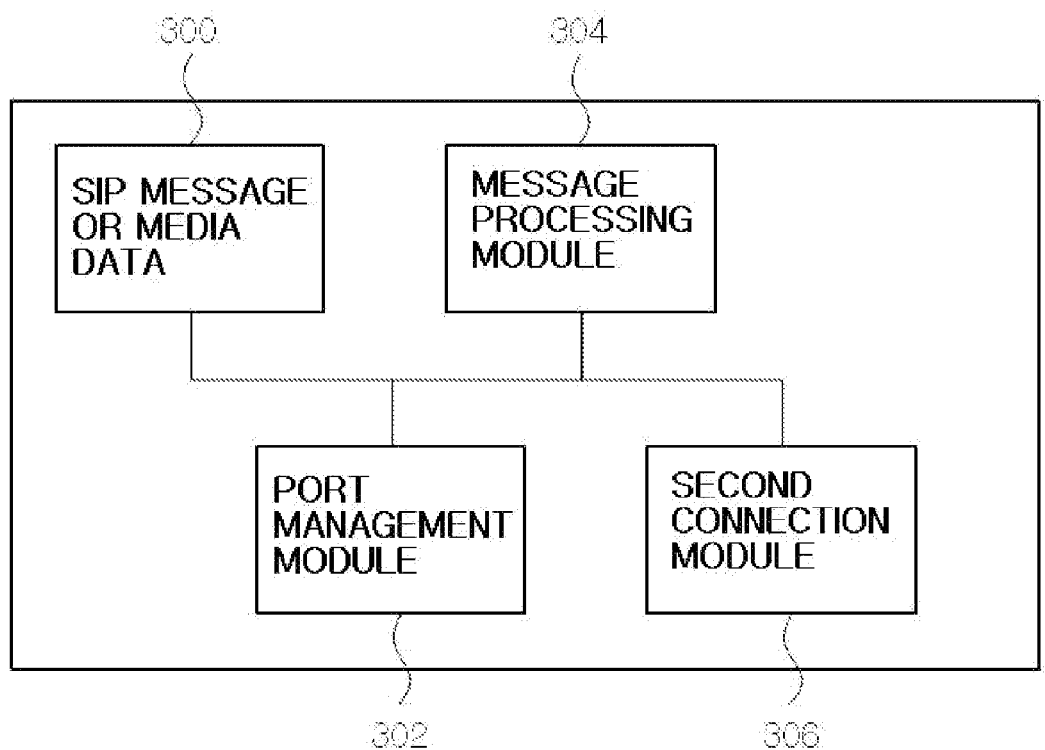
FIG. 3 is a block diagram showing the constitution of an SIP broker server according to an exemplary embodiment of the present disclosure.

FIG. 3 is a block diagram showing the detailed constitution of an SIP broker server according to an exemplary embodiment of the present disclosure.

As shown in the drawing, an SIP broker server 104 according to an exemplary embodiment of the present disclosure includes a first connection module 300, a port management module 302, a message processing module 304, and a second connection module 306.

The first connection module 300 is connected with UE 102 using TCP, receives an SIP message combined with a tunneling header from the connected UE 102, and delivers the received SIP message to the message processing module 304, which will be described later. Also, when an SIP message combined with a tunneling header is received from the message processing module 304, the first connection module 300 transmits the received SIP message to the UE 102. The SIP messages are exchanged through a TCP connection established between the first connection module 300 and the UE 102.

The port management module 302 assigns a port to the UE 102 connected with the first connection module 300, and manages the assigned port.

When the TCP connection with the first connection module 300 is completed, the UE 102 transmits a port assignment request REQUEST_PORT for message exchange with communication counterpart 106 to the first connection module 300. Then, the port management module 302 assigns one of assignable ports to the UE 102 in response to the port assignment request received from the UE 102. The assigned port is used for message exchange between the second connection module, which will be described later, and the communication counterpart 106. In other words, through the port assigned to the UE 102 by the port management module 302, the second connection module 306 exchanges SIP messages from which tunneling headers have been removed with the communication counterpart 106.

In addition, when a connection with the UE 102 is abnormally terminated, the port management module 302 starts a timer for releasing the port assigned to the UE 102. The case in which a connection with the UE 102 is abnormally terminated denotes a case in which a TCP connection with the UE 102 is released with no explicit connection release request received from the UE 102. When no port reassignment request is received from the UE 102 until the timer expires, the port management module 302 releases the port assigned to the UE 102. After that, the released port can be assigned to other UE. However, when a port reassignment request is received from the UE 102 before the timer expires, the port management module 302 reassigns the initially assigned port to the UE 102.

In this way, the port management module 302 starts the timer for port reassignment and release due to the following reason. As described above, even when no connection release request is explicitly received from the UE 102, the connection between the UE 102 and the SIP broker server 104 may be abnormally terminated for various reasons (e.g., a temporary communication fault occurring at the UE 102 or so on). In this case, the UE 102 requests port reassignment from the SIP broker server 104. However, when the SIP broker server 104 releases a port upon recognizing that the connection has been abnormally terminated, the port may be assigned to other UE before a port reassignment request. To prevent this case, in the present disclosure, when the connection between the UE 102 and the SIP broker server 104 is abnormally terminated, a timer is started, and the corresponding port is not released for a predetermined time. When a port reassignment request is received during the predetermined time, the port is reassigned.

Meanwhile, the port management module 302 may be configured to assign a port having an even number among assignable ports to the UE 102 during the port assignment. This is intended to transmit media data as well as SIP messages between the UE 102 and the communication counterpart 106 using the port. In request for commends (RFC)-1889 (a transport protocol for real-time applications) that is a standard agreement for real-time data transmission in a network, only even-numbered ports are used for transmission of Real-time Transport Protocol (RTP) data, and odd-numbered ports are used for transmission of RTP Control Protocol (RTCP) data corresponding to the RTP data. Accordingly, in the present disclosure, only even-numbered ports are assigned during port assignment, such that the present disclosure can comply with the standard.

Next, when an SIP message is received from the first connection module 300, the message processing module 304 removes a tunneling header from the SIP message and delivers the SIP message to the second connection module 306. At this time, the message processing module 304 replaces a source address of the SIP message with an address of the SIP broker server 104.

Also, when an SIP message is received from the communication counterpart 106 through the second connection module 306, the message processing module 304 replaces a destination address of the received SIP message with a local address of the UE 102, generates a packet by combining a tunneling header with the SIP message having the replaced destination address, and delivers the generated packet to the first connection module 300.

Lastly, the second connection module 306 transmits the SIP message from which the tunneling header has been removed by the message processing module 304 to the communication counterpart 106 using UDP. At this time, the second connection module 306 is configured to transmit the SIP message to the port assigned by the port management module 302.

Figure 4:
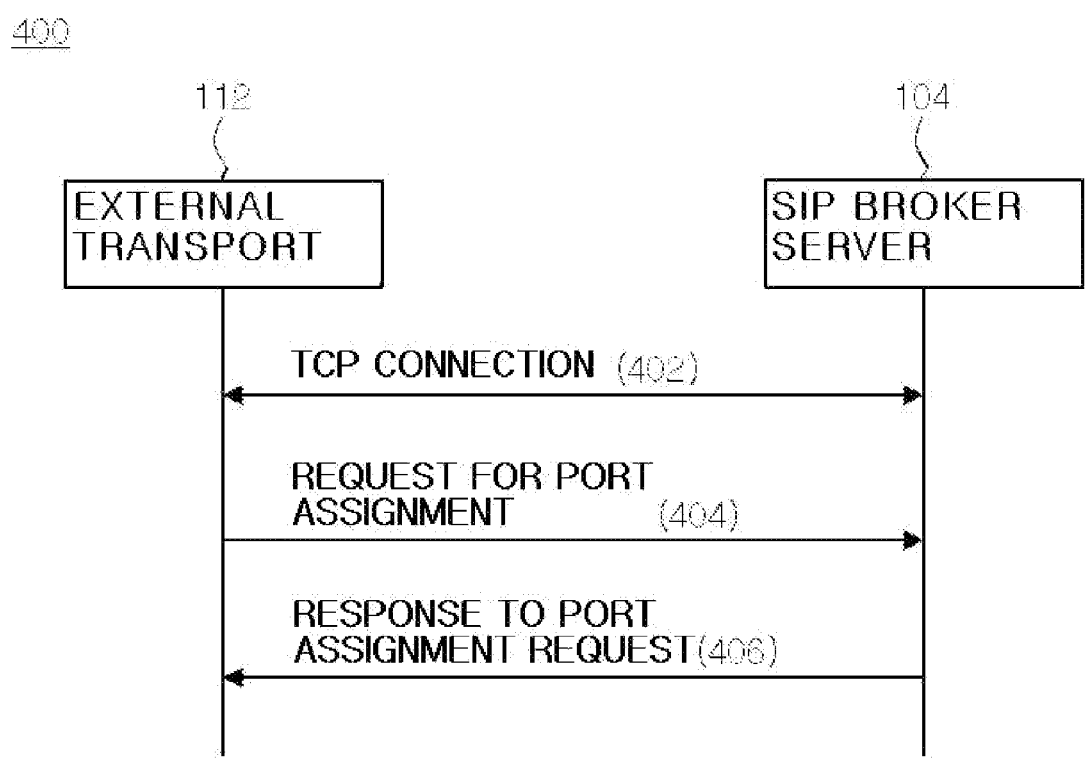
FIG. 4 is a flowchart illustrating a session establishment process between an external transport of user equipment (UE) and an SIP broker server in a system for transmitting and receiving SIP messages according to an exemplary embodiment of the present disclosure.

FIG. 4 is a flowchart illustrating a session establishment process between an external transport of UE and an SIP broker server in a system for transmitting and receiving SIP messages according to an exemplary embodiment of the present disclosure.

First, an external transport 112 establishes a TCP connection with an SIP broker server 104 (402), and transmits a port assignment request REQUEST_PORT for message exchange with a communication counterpart 106 to the connected SIP broker server 104 (404). At this time, the external transport 112 transmits a local address of the UE 102 to the SIP broker server 104 during the port assignment request process.

Subsequently, the SIP broker server 104 selects and newly assigns one of assignable ports as a port for exchanging SIP messages with the communication counterpart 106, and transmits a response REQUEST_PORT:SUCCESS to the port assignment request to the external transport 112 (406).

Figure 5:
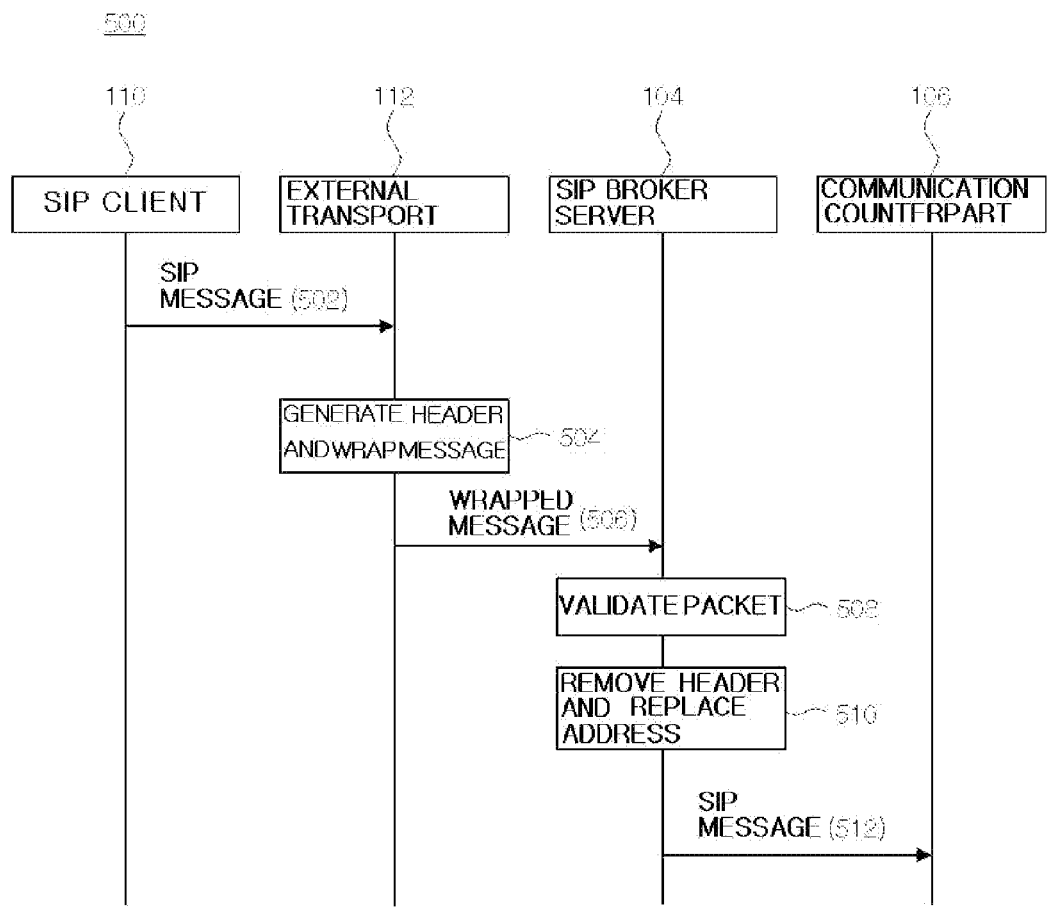
FIG. 5 is a flowchart illustrating a process for UE to transmit an SIP message to a communication counterpart in a system for transmitting and receiving SIP messages according to an exemplary embodiment of the present disclosure.

FIG. 5 is a flowchart illustrating a process for UE to transmit an SIP message to a communication counterpart in a system for transmitting and receiving SIP messages according to an exemplary embodiment of the present disclosure.

First, when an SIP message is generated, an SIP client 110 delivers the generated SIP message to an external transport 112 (502). At this time, for example, UDP may be used as a transmission protocol in delivery of the message.

Next, the external transport 112 generates a tunneling header for wrapping the received SIP message, and generates a new packet by combining the tunneling header with the SIP message (504). As mentioned above, the generated packet has the form of a general HTTP packet.

Subsequently, the external transport 112 transmits the packet to an SIP broker server 104 using TCP (506).

The SIP broker server 104 receives the packet and then checks whether or not there is an error in the received packet (508). Whether or not there is an error in the packet means, for example, whether the header is a normal HTTP header, whether reception of the packet has been normally completed, and so on. When it is determined in the checking step that there is an error in the received packet, the packet is deleted and retransmission from the external transport 112 is requested.

On the other hand, when it is determined that there is no error in the received packet, the SIP broker server 104 extracts only the SIP message by removing the tunneling header from the received packet, replaces a source address of the extracted SIP message with an address of the SIP broker server 104 (510), and then transmits the SIP message to a communication counterpart 106.

Figure 6:
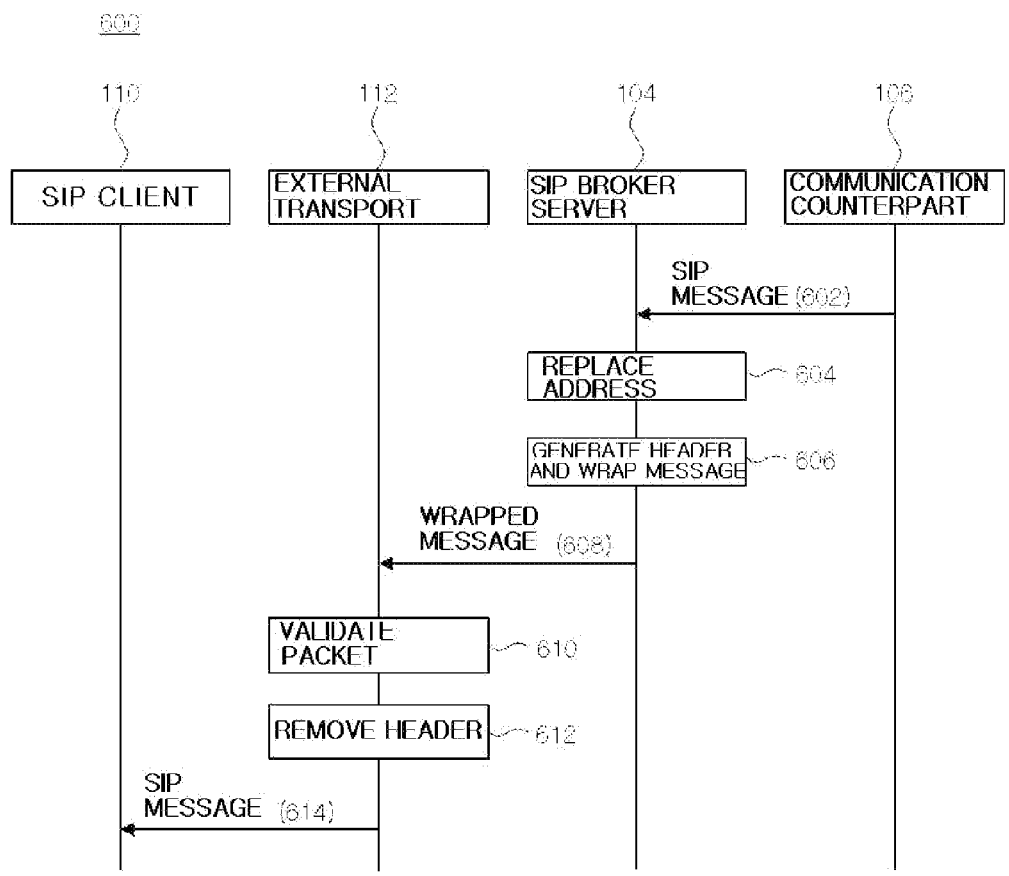
FIG. 6 is a flowchart illustrating a process for a communication counterpart to transmit an SIP message to UE in a system for transmitting and receiving SIP messages according to an exemplary embodiment of the present disclosure.

FIG. 6 is a flowchart illustrating a process for a communication counterpart to transmit an SIP message to UE in a system for transmitting and receiving SIP messages according to an exemplary embodiment of the present disclosure.

First, when an SIP message is received from a communication counterpart 106 (602), an SIP broker server 104 changes a destination address of the received SIP message from an address of the SIP broker server 104 to an address of UE 102 (604). After that, the SIP broker server 104 generates a tunneling header for wrapping the received SIP message, and generates a new packet by combining the tunneling header with the SIP message (606).

Next, the SIP broker server 104 transmits the packet to the UE 102 using TCP (608).

The external transport 112 in the UE 102 receives the packet and then checks whether or not there is an error in the received packet (610). When it is determined in the checking step that there is an error in the received packet, the packet is deleted and retransmission from the SIP broker server 104 is requested.

When it is determined that there is no error in the received packet, the external transport 112 extracts only the SIP message by removing the tunneling header from the received packet, and transmits the extracted SIP message to an SIP client 110 (614).

Figure 7:
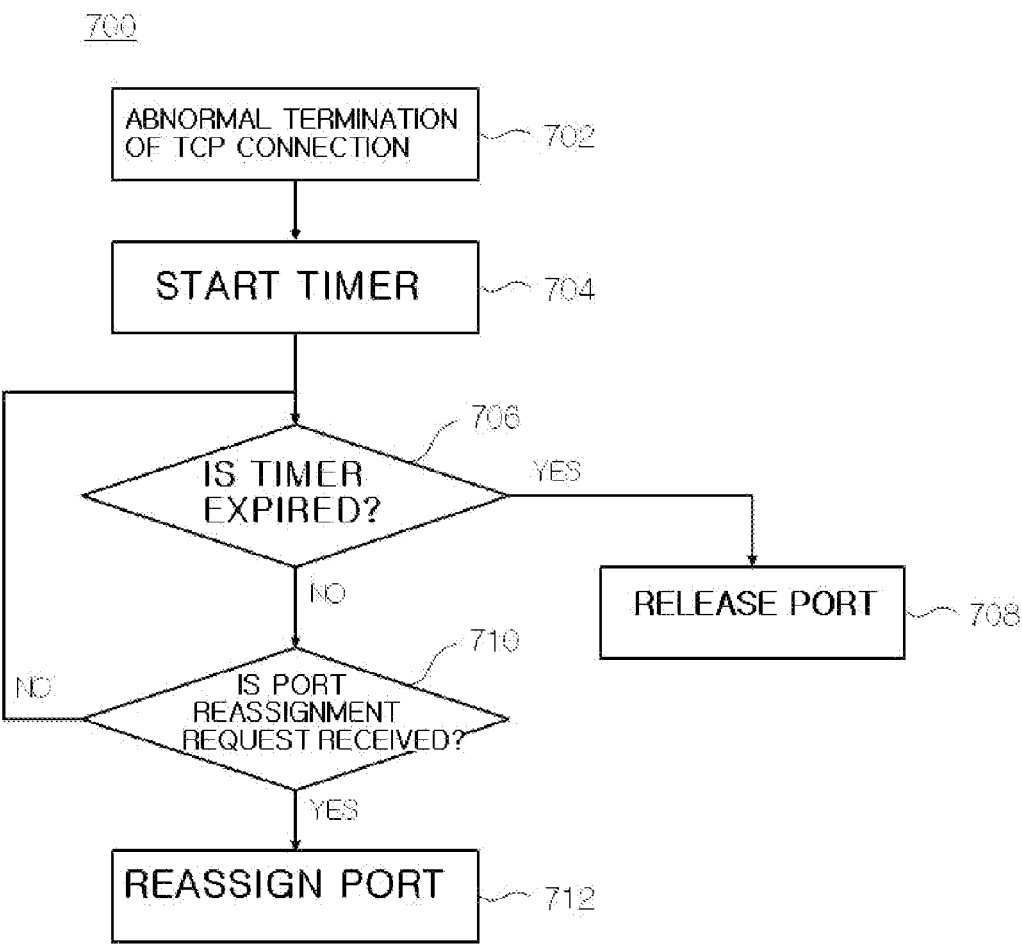
FIG. 7 is a flowchart illustrating a session re-establishment process between an external transport of UE and an SIP broker server in a system for transmitting and receiving SIP messages according to an exemplary embodiment of the present disclosure.

FIG. 7 is a flowchart illustrating a session re-establishment process when a connection between an external transport of UE and an SIP broker server is abnormally terminated in a system for transmitting and receiving SIP messages according to an exemplary embodiment of the present disclosure.

First, when a TCP connection between an external transport 112 and an SIP broker server 104 is abnormally terminated (702), the SIP broker server 104 starts a timer for releasing a port assigned to UE 102 (704). When the timer expires (706), the SIP broker server 104 releases the port assigned to the UE 102 (708).

However, when a port reassignment request REQUEST_PORT:(PORT_NUMBER) is received from the external transport 112 before the timer expires (710), the SIP broker server 104 reassigns the previously assigned port to the UE 102 (712).

In an exemplary embodiment of the present disclosure, even when UE is inside a security means such as a firewall or so on, a message traverses the security means and the UE can exchange SIP messages with an external proxy server so that service using the SIP can be provided regardless of restrictions of a network.

In addition, the present disclosure uses a method of wrapping an SIP message as an HTTP packet for message tunneling through the security means, and it is unnecessary to analyze the SIP message itself. Thus, it is possible to minimize the amount of calculation necessary for tunneling and perform message tunneling regardless of the type of the security means. In other words, in the present disclosure, an SIP broker server functions only to assign a UDP port to be mapped to a TCP connection with the UE and transmit a message received through the TCP connection to the assigned UDP port, and does not include additional functions of session information management, etc., unlike an existing TCP-based SIP proxy. Accordingly, in the present disclosure, one SIP broker server can process more data compared to a TCP-based SIP proxy or so on.

Further, in the case of an existing SIP proxy, a TCP session between UE and the SIP proxy is mapped to a TCP session between the SIP proxy and a communication counterpart in a one-to-one fashion, and thus it is possible to exchange messages with only one destination through one TCP session. However, in the present disclosure, a TCP session between UE and an SIP broker server is mapped to a UDP port in a one-to-one fashion, and thus it is possible to exchange messages with a plurality of communication counterparts through the UDP port.

It will be apparent to those skilled in the art that various modifications can be made to the above-described exemplary embodiments of the present disclosure without departing from the spirit and scope of the present disclosure. Thus, it is intended that the present disclosure cover all such modifications provided they fall within the scope of the appended claims and their equivalents.

What is claimed is:

1. A system for transmitting and receiving Session Initiation Protocol (SIP) messages, comprising:
    user equipment (UE) including an SIP client configured to generate an SIP message, and an external transport configured to receive the SIP message from the SIP client, generate a packet by combining a tunneling header with the received SIP message, and transmit the generated packet to an SIP broker server; and
    the SIP broker server configured to assign a port among assignable ports to the UE in response to a port assignment request received from the UE, remove the tunneling header from the packet received from the external transport through the assigned port, and transmit the SIP message from which the tunneling header has been removed to a communication counterpart of the UE,
    wherein, when a connection between the SIP broker server and the UE is abnormally terminated after the SIP broker server assigns the port, the SIP broker server determines whether a port reassignment request is received from the UE during a predetermined period, and
    wherein the SIP broker server releases the port assigned to the UE when no port reassignment request is received during the predetermined period, and reassigns the port assigned to the UE when the port reassignment request is received during the predetermined period.

2. The system of claim 1, wherein the tunneling header comprises:
    a peer-to-peer (P2P) header combined with the SIP message and comprising an Internet Protocol (IP) address and a port number of the communication counterpart; and
    a HyperText Transfer Protocol (HTTP) header combined with the SIP message combined with the P2P header to convert the SIP message into an HTTP packet.

3. The system of claim 2, wherein the external transport transmits the packet generated by combining the tunneling header with the SIP message to the SIP broker server using Transmission Control Protocol (TCP).

4. The system of claim 2, wherein the SIP broker server replaces a source address of the SIP message from which the tunneling header has been removed with an address of the SIP broker server and transmits the SIP message comprising the address of the SIP broker server to the communication counterpart.

5. The system of claim 1, wherein, when another SIP message is received from the communication counterpart, the SIP broker server replaces a destination address of the received other SIP message with a local address of the UE, generates a packet by combining a tunneling header with the other SIP message, and transmits the generated packet to the UE.

6. The system of claim 5, wherein the external transport receives the packet transmitted from the SIP broker server, removes the tunneling header from the received packet, and transmits the packet to the SIP client.

7. A Session Initiation Protocol (SIP) broker server, comprising:
    a first connection circuitry connected with user equipment (UE) through a connection based on Transmission Control Protocol (TCP), and configured to receive an SIP message combined with a tunneling header from the UE;
    a port management circuitry configured to manage a port assigned to the UE connected with the first connection circuitry;
    a message processing circuitry configured to remove the tunneling header from the SIP message received from the first connection circuitry; and
    a second connection circuitry configured to transmit, using User Datagram Protocol (UDP), the SIP message from which the tunneling header has been removed to a communication counterpart of the UE,
    wherein the message processing circuitry replaces a source address of the SIP message from which the tunneling header has been removed with an address of the SIP broker server,
    wherein, when a connection between the SIP broker server and the UE is abnormally terminated, the port management circuitry determines whether a port reassignment request is received from the UE during a predetermined period, and
    when no port reassignment request is received during the predetermined period, the port management circuitry releases the port assigned to the UE.

8. The SIP broker server of claim 7, wherein, when the port assignment request is received from the UE, the port management circuitry assigns a port among assignable ports to the UE.

9. The SIP broker server of claim 8, wherein the second connection circuitry transmits the SIP message from which the tunneling header has been removed to the port assigned by the port management circuitry.

10. A Session Initiation Protocol (SIP) broker server, comprising:
- a first connection circuitry connected with user equipment (UE) through a connection based on Transmission Control Protocol (TCP), and configured to receive an SIP message combined with a tunneling header from the UE;
- a port management circuitry configured to manage a port assigned to the UE connected with the first connection circuitry;
- a message processing circuitry configured to remove the tunneling header from the SIP message received from the first connection circuitry; and
- a second connection circuitry configured to transmit, using User Datagram Protocol (UDP), the SIP message from which the tunneling header has been removed to a communication counterpart of the UE,
- wherein, when a port assignment request is received from the UE, the port management circuitry assigns a port among assignable ports to the UE,
- wherein, when a connection between the SIP broker server and the UE is abnormally terminated, the port management circuitry determines whether a port reassignment request is received from the UE during a predetermined period, and
- when no port reassignment request is received during the predetermined period, the port management circuitry releases the port assigned to the UE.

11. The SIP broker server of claim 10, wherein, when the port reassignment request is received from the UE during the predetermined period, the port management circuitry reassigns the port assigned to the UE.

12. The SIP broker server of claim 7, wherein the port management circuitry assigns a port having an even number among assignable ports to the UE.

13. The SIP broker server of claim 7, wherein the tunneling header includes:
- a peer-to-peer (P2P) header combined with the SIP message and including an Internet protocol (IP) address and a port number of the communication counterpart; and
- a HyperText Transfer Protocol (HTTP) header combined with the SIP message combined with the P2P header to convert the SIP message into an HTTP packet.

14. The SIP broker server of claim 7, wherein, when another SIP message is received from the communication counterpart through the second connection circuitry, the message processing circuitry replaces a destination address of the received other SIP message with a local address of the UE and generates a packet by combining a tunneling header with the other SIP message.

15. The SIP broker server of claim 14, wherein the first connection circuitry transmits the packet generated by the message processing circuitry to the UE.

16. A method of transmitting and receiving Session Initiation Protocol (SIP) messages, comprising:
- receiving, at an SIP broker server, a port assignment request from a user equipment (UE);
- assigning, by the SIP broker server, a port among assignable ports to the UE in response to the port assignment request;
- receiving, at the SIP broker server, a packet from the user equipment (UE);
- extracting, by the SIP broker server, an SIP message by removing a tunneling header from the received packet;
- replacing, by the SIP broker server, a source address of the extracted SIP message with an address of the SIP broker server; and
- transmitting, by the SIP broker server, the extracted SIP message comprising the address of the SIP broker server to a communication counterpart of the UE,
- wherein when a connection between the SIP broker server and the UE is abnormally terminated after the SIP broker server assigns the port, the SIP broker server determines whether a port reassignment request is received from the UE during a predetermined period, and
- wherein the SIP broker server releases the port assigned to the UE when no port reassignment request is received during the predetermined period, and reassigns the port assigned to the UE when the port reassignment request is received during the predetermined period.

17. The method of claim 16, wherein receiving the packet includes receiving, at the SIP broker server, the packet from the UE through a connection based on Transmission Control Protocol (TCP).

18. The method of claim 16, further comprising, after receiving another packet and before extracting an SIP message from the other packet, determining, by the SIP broker server, whether there is an error in the received other packet,
- wherein, when it is determined that there is no error in the received other packet, the SIP broker extracts the SIP message from the other packet.

19. The method of claim 18, wherein, when it is determined that there is an error in the received other packet, the SIP broker deletes the received other packet.

20. The method of claim 16, wherein transmitting the extracted SIP message comprises transmitting the extracted SIP message through the assigned port.

21. The method of claim 16, wherein assigning the port comprises assigning a port having an even number among the assignable ports to the UE.

22. A method of transmitting and receiving Session Initiation Protocol (SIP) messages, comprising:
- receiving, at an SIP broker server, a port assignment request from a user equipment (UE);
- assigning, by the SIP broker server, a port among assignable ports to the UE in response to the port assignment request;
- receiving, at the SIP broker server, an SIP message from a communication counterpart;
- replacing, by the SIP broker server, a destination address of the received SIP message with a local address of the UE;
- generating, by the SIP broker server, a packet by combining a tunneling header with the SIP message comprising the local address of the UE; and
- transmitting, by the SIP broker server, the generated packet to the UE,
- wherein when a connection between the SIP broker server and the UE is abnormally terminated after the SIP broker server assigns the port, the SIP broker server determines whether a port reassignment request is received from the UE during a predetermined period, and
- wherein the SIP broker server releases the port assigned to the UE when no port reassignment request is received during the predetermined period, and reassigns the port assigned to the UE when the port reassignment request is received during the predetermined period.

23. The method of claim 22, wherein transmitting the generated packet comprises transmitting the generated packet using Transmission Control Protocol (TCP).

* * * * *